C. E. SYMONDS.
Grafting.

No. 141,092.

Patented July 22, 1873.

UNITED STATES PATENT OFFICE.

CHARLES E. SYMONDS, OF SALEM, MASSACHUSETTS.

IMPROVEMENT IN GRAFTING.

Specification forming part of Letters Patent No. 141,092, dated July 22, 1873; application filed March 15, 1873.

*To all whom it may concern:*

Be it known that I, CHARLES E. SYMONDS, of Salem, of the county of Essex and State of Massachusetts, have invented a new and useful Improvement in Grafting Trees, Vines, &c.; and do hereby declare the same to be fully described in the following specification and represented in the accompanying drawings, in which—

Figure 1:
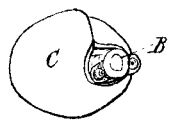
Figure 2:
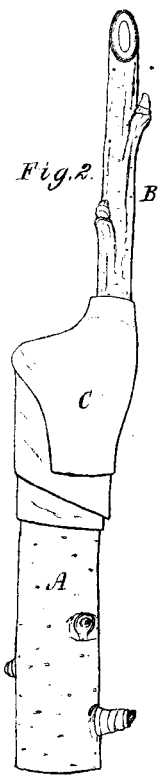

Figure 1 denotes a top view, and Fig. 2 a side view, of a stock grafted in accordance with my plan.

Instead of using, as a cover to the graft-joint, clay or wax or other article of like nature inelastic, and liable to dry and crack or crumble, I employ India rubber in the form of an adhesive sheet or band, which, when applied to the stock and scion, will not only form a water-proof covering to the joint, but admit of the natural expansion of the stock and scion, or either, from time to time, as may be required, and maintain its normal or water-proof condition.

I have found that such use and application of rubber in grafting preserves the sap from evaporation at the joint, thereby wonderfully facilitating the growth of the scion or bud, and rendering it practicable to graft at any time during the summer months.

In the drawings, A denotes the stock, and B the scion. India rubber, C, in the form of an adhesive band, is wound closely about the stock and the scion, so as to thoroughly cover the joint and the cut end or part of the stock, the whole being so that the folds of the rubber may adhere or be connected together and constitute an elastic and water-proof cover to the joint or parts to be protected from evaporation of the sap or liquid necessary for the preservation and growth of the scion.

My use of rubber will apply to other kinds of grafting than cleft grafting—that is, it can be used in saddle, splice, whip, or tongue grafting, and will answer for vines and shrubs as well as for trees.

The rubber does not dry and crack as clay and wax do, especially under the growth of the stock or the scion. By maintaining its normal and water-proof condition for a long period, it affords complete protection from evaporation of the sap, and, besides, does not bind the plant or tree so as to prevent it from properly expanding.

I claim as my invention—

The described improvement in the process of grafting, it consisting in the use or application of India rubber with the stock and scion or bud, substantially in manner as specified, the rubber being in the form of an adhesive sheet or band wound about the stock and scion, and against or upon itself, so as to cause the folds to adhere together and constitute an elastic and water-proof cover to the joint, all as explained.

CHAS. E. SYMONDS.

Witnesses:
R. H. EDDY,
S. N. PIPER.